United States Patent
Lim et al.

(10) Patent No.: US 10,746,355 B2
(45) Date of Patent: Aug. 18, 2020

(54) LIGHTING DEVICE

(71) Applicant: LG INNOTEK CO., LTD., Seoul (KR)

(72) Inventors: Eay Jin Lim, Seoul (KR); Jae Hyuk Jang, Seoul (KR); Hyun Duck Yang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 131 days.

(21) Appl. No.: 16/064,384

(22) PCT Filed: Dec. 21, 2016

(86) PCT No.: PCT/KR2016/015013
§ 371 (c)(1),
(2) Date: Jun. 20, 2018

(87) PCT Pub. No.: WO2017/111460
PCT Pub. Date: Jun. 29, 2017

(65) Prior Publication Data
US 2018/0372279 A1  Dec. 27, 2018

(30) Foreign Application Priority Data

Dec. 21, 2015 (KR) .......................... 10-2015-0183017

(51) Int. Cl.
*F21V 21/00* (2006.01)
*F21K 9/61* (2016.01)
(Continued)

(52) U.S. Cl.
CPC ................ *F21K 9/61* (2016.08); *F21S 43/14* (2018.01); *F21S 43/239* (2018.01);
(Continued)

(58) Field of Classification Search
CPC ........ F21S 43/31; F21S 43/26; G02B 27/2214
(Continued)

(56) References Cited

U.S. PATENT DOCUMENTS

| 7,553,050 | B2 * | 6/2009 | Hwang | ..................... F21V 5/02 |
| | | | | 359/599 |
| 2005/0157398 | A1 * | 7/2005 | Nagaoka | ............ G02B 27/0025 |
| | | | | 359/630 |

(Continued)

FOREIGN PATENT DOCUMENTS

| JP | 2005-202145 | 7/2005 |
| KR | 10-2010-0113149 | 10/2010 |

(Continued)

OTHER PUBLICATIONS

International Search Report (with English Translation) and Written Opinion dated Mar. 21, 2017 issued in Application No. PCT/KR2016/015013.

*Primary Examiner* — Laura K Tso
(74) *Attorney, Agent, or Firm* — KED & Associates LLP

(57) ABSTRACT

Provided is a lighting device that converts an exiting light into a stereoscopic light having a sense of depth or a sense of volume, whereby light images having stereoscopic effects can be implemented using light emitted from a light-emitting device and simultaneously, a structure of a printed circuit board (PCB) located at a lower portion of a light passage portion is eliminated and a direct-type light-emitting device located at sides of the light passage portion and having high versatility is used such that flexibility of the light passage portion is attained and a degree of freedom of a design can be enhanced.

20 Claims, 8 Drawing Sheets

(51) Int. Cl.
| | |
|---|---|
| *F21S 43/20* | (2018.01) |
| *F21S 43/245* | (2018.01) |
| *F21S 43/31* | (2018.01) |
| *F21S 43/239* | (2018.01) |
| *G02B 6/00* | (2006.01) |
| *G02B 30/27* | (2020.01) |
| *F21V 7/04* | (2006.01) |
| *F21V 7/10* | (2006.01) |
| *F21S 43/14* | (2018.01) |
| *F21V 19/00* | (2006.01) |
| *F21V 33/00* | (2006.01) |
| *F21Y 105/10* | (2016.01) |
| *F21Y 115/00* | (2016.01) |
| *F21Y 115/10* | (2016.01) |

(52) U.S. Cl.
CPC ............ *F21S 43/245* (2018.01); *F21S 43/26* (2018.01); *F21S 43/31* (2018.01); *F21V 7/04* (2013.01); *F21V 7/10* (2013.01); *F21V 19/001* (2013.01); *F21V 33/006* (2013.01); *G02B 6/00* (2013.01); *G02B 30/27* (2020.01); *F21Y 2105/10* (2016.08); *F21Y 2115/00* (2016.08); *F21Y 2115/10* (2016.08)

(58) Field of Classification Search
USPC ................ 362/627, 628, 617, 618, 619, 620
See application file for complete search history.

(56) References Cited

U.S. PATENT DOCUMENTS

| | | | |
|---|---|---|---|
| 2010/0309648 | A1* | 12/2010 | Willemsen ........... G02B 6/0078 362/84 |
| 2014/0204580 | A1* | 7/2014 | Yeo ................... G02F 1/133603 362/235 |

FOREIGN PATENT DOCUMENTS

| | | |
|---|---|---|
| KR | 10-2013-0014324 | 2/2013 |
| KR | 10-2014-0078371 | 6/2014 |
| KR | 10-2015-0078935 | 7/2015 |
| WO | WO 2009/095866 | 8/2009 |

\* cited by examiner

LIGHTING DEVICE

CROSS-REFERENCE TO RELATED PATENT APPLICATIONS

This application is a U.S. National Stage Application under 35 U.S.C. § 371 of PCT Application No. PCT/KR2016/015013, filed Dec. 21, 2016, which claims priority to Korean Patent Application No. 10-2015-0183017, filed Dec. 21, 2015, whose entire disclosures are hereby incorporated by reference.

TECHNICAL FIELD

The present invention relates to a lighting device that converts an exiting light into a stereoscopic light having a sense of depth and a sense of volume.

BACKGROUND ART

In general, lighting devices are devices that make a dark portion bright using a variety of light sources. Lighting devices are used to illuminate a certain object or place and to express an atmosphere with a desired shape or color.

Recently, a variety of lighting devices using a light-emitting diode (LED) have become popular due to development of an LED technology. For example, a lighting device according to the related art includes an LED light source and a diffusion plate that diffuses light emitted from the LED light source to emit a diffused light to the outside.

Most lighting devices according to the related art are configured to output uniform light to the entire light-emitting surface. Also, in order to express the atmosphere with the desired shape or color, a portion of lighting devices according to the related art use a color filter or a filter having a light-transmitting hole of a desired shape.

However, when the atmosphere is expressed in a desired shape or color using a lighting device according to the related art, the configuration of a device is mechanically complicated. Thus, a degree of freedom of design in the desired shape is limited, and installation or manipulation is difficult. In this way, lighting devices that are easily manufactured and installed with a simple structure are required to express light images having the desired shape or atmosphere.

Furthermore, in case of a lighting device that should be installed in a predetermined space, such as in a car lamp, flexible characteristics are required in the lighting device. However, due to a structural limitation of a light-emitting package itself, it is difficult to freely make a design and to satisfy implementation of aesthetic elements of an image when the lighting device is not turned on.

DISCLOSURE

Technical Problem

The present invention is directed to providing a lighting device, whereby, in particular, light images having stereoscopic effects can be implemented using light emitted from a light-emitting device and simultaneously, a structure of a printed circuit board (PCB) located at a lower portion of a light passage portion is eliminated and a direct-type light-emitting device located at sides of the light passage portion and having high versatility is used such that flexibility of the light passage portion is attained and a degree of freedom of design can be enhanced.

Technical Solution

One aspect of the present invention provides a lighting device including: a light-transmitting support member; a light guide unit located on the light-transmitting support member; a light source unit located on sides of the light guide unit; and a light converter configured to convert light which is incident on the light guide unit, wherein the light source unit includes a printed circuit board (PCB) and a light-emitting device located on a first flat surface of the PCB, and the first flat surface of the PCB faces the sides of the light guide unit, and the light-emitting device is located on the light-transmitting support member.

Advantageous Effects

According to an embodiment of the present invention, a light image having a stereoscopic effect can be implemented using light emitted from a light-emitting device and simultaneously, a structure of a printed circuit board (PCB) located at a lower portion of a light passage portion is eliminated and a direct-type light-emitting device located at sides of the light passage portion and having high versatility is used such that flexibility of the light passage portion is attained and a degree of freedom of design can be enhanced.

Also, a lighting device in which a stereoscopic effect is implemented and which simultaneously has a flexible structure on a sheet and can be effectively used in a flat surface or an inside/outside curved portion of an object in which lighting is required to be installed, such as a building, a facility, a furniture, or a car, can be provided.

Furthermore, according to an embodiment of the present invention, a reflection member and a transparent support member are located at the lower portion of the light passage portion so that a lighting device can be designed in such a way that the lighting device includes various designs which may be exposed when the lighting device is turned on according to a design of the reflection member.

In addition, an arrangement structure of an existing printed circuit board (PCB) is eliminated from the lower portion of the light passage portion so that the entire thickness of the lighting device is reduced. When a light-emitting diode (LED) package, such as a chip scale package (CSP), is used, the thickness of a lead frame or wire is eliminated so that the light device can be made to be thinner and thus, the lighting device that realizes a three-dimensional (3D) image with a thinner structure can be implemented.

Furthermore, a light image of a linear light which has various shapes of stereoscopic effects can be implemented according to relative positions of light sources and patterns or a slope or curvature of the patterns themselves. The lighting device that can be easily used in an inside/outside curved portion of an object in which lighting is required to be installed, such as a building, a facility, a furniture, or a car, using a structure of the flexible sheet can be provided. Also a lighting device for a vehicle which is provided on the flexible sheet that is advantageous in various aspects such as volume, thickness, weight, price, life span, stability, a degree of freedom of design, and installation feasibility can be provided as a lamp (a headlight, a rear light, a fog light, an indoor light, a door scarf) for the vehicle.

MODES OF THE INVENTION

Figure 1:
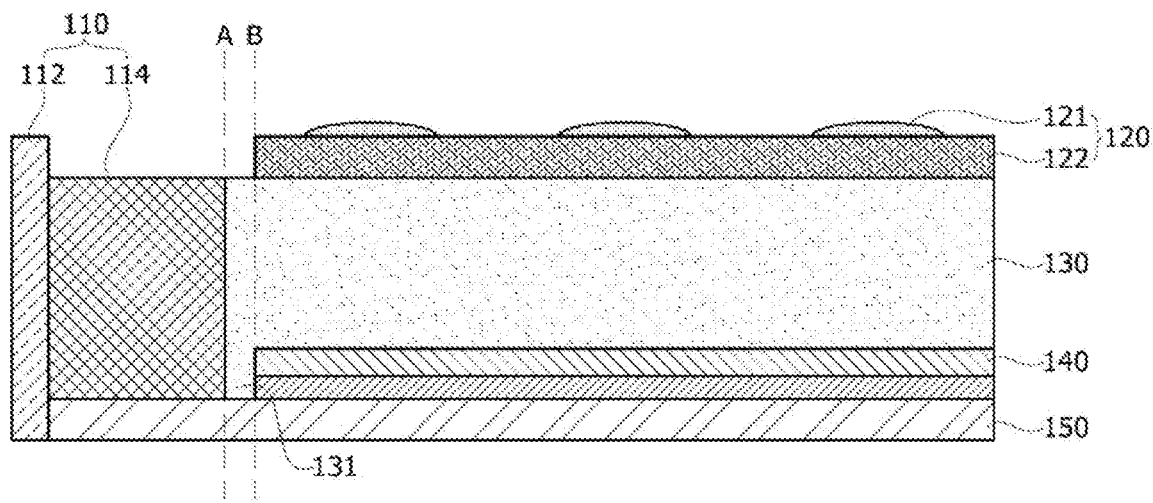
FIG. 1 is a cross-sectional conceptual view of main portions of a lighting device according to an embodiment of the present invention.

Hereinafter, a configuration and an operation of the present invention will be described in detail with reference to the accompanying drawings. Like reference numerals represent the same components regardless of the number of the drawings, and a detailed description thereof will be omitted. It will be understood that, although the terms first, second, etc. may be used herein to describe various elements, these elements should not be limited by these terms. These terms are only used to distinguish one element from another.

FIG. 1 is a cross-sectional conceptual view of essential portions of a lighting device according to an embodiment of the present invention (hereinafter, referred to as a 'present device').

Referring to FIG. 1, the present device may include a light guide unit 130 that induces light and emits the guided light to a light exiting surface, a light source unit 110 located at sides of the light guide unit 130 and emitting light inside the light guide unit 130, and a light converter 120 that converts light passing through the light source unit 110 or the light guide unit 130 into a stereoscopic light.

The light source unit 110 of the present device includes a printed circuit board (PCB) 112 and a light-emitting device 114 located at a first surface of the PCB 112. The PCB 112 may be located in other regions than a vertical lower portion of the light guide unit 130. In this case, 'other regions than the vertical lower portion' may refer to a region excluding upper and lower portions of the light guide unit 130 as illustrated in FIG. 1.

In detail, unlike in a structure of a general lighting device where the PCB 112 is located at a lower portion of the light guide unit 130, the PCB 112 of the present device may be located at a side portion of the light guide unit 130. In general, in case of a PCB on which a light-emitting device is mounted, the lighting device is located at a lower portion of a light guide unit. The PCB in this case may acquire a solid support force using a substrate on which circuit patterns are formed, for example, a Flame Retardant 4/Flame retardant fiber glass (FR-4) PCB. The PCB may be one among a metal core PCB, the FR-4 PCB, and a general PCB.

That is, when the PCB is located at the lower portion of the light guide unit of the lighting device, the PCB having a predetermined length is used to realize a support force. However, the PCB has characteristics of impermeability and inflexibility. Thus, the PCB has a limitation in permeability and a degree of flexibility of light while being used. Also, the PCB at the lower portion of the light guide unit is made of a hard and specific permeability material. Thus, there are limitations in bending or permeability of a product. Thus, the PCB may have an excellent appearance when the lighting device in various fields, including an automotive field, is turned on but may lack in design elements when the lighting device is turned off.

Thus, in an embodiment of the present invention, the light source unit 110 may be located at sides of the light guide unit, and in particular, the PCB 112 may be located at the sides of the light guide unit and may be located in an unbalanced/unsymmetrical manner with respect to a lateral direction of the light guide unit.

Thus, a region in which there is no PCB, based on sides B of the light guide unit, has a certain flexibility such that free arrangement is possible in lighting of the vehicle. Furthermore, the structure in which the 'PCB is located in a non-equilibrium manner with respect to the widthwise direction of the light guide unit', is an arrangement structure including an extension where a surface of the PCB 112 is located parallel to the sides B of the light guide unit 130 or with a predetermined inclination in a structure in which the light exiting surface A of the light-emitting device 114 is located adjacent to the sides B of the light guide unit 130, as illustrated in FIG. 1. That is, the extension line of the surface of the PCB 112 may be substantially perpendicular with respect to the widthwise direction of the light guide unit 130 or may have a predetermined inclination.

Furthermore, in the structure shown in FIG. 1, the light exiting surface A of the light-emitting device 114 is spaced a predetermined width apart from the sides B of the light guide unit 130. However, embodiments of the present invention are not limited thereto. The light exiting surface A of the light-emitting device 114 may be implemented as being pressed against the sides B of the light guide unit 130.

In addition, a light-transmitting support member 150 having a light transmitting property may be further included at the lower portion of the light guide unit 130. In this case, the light-transmitting support member 150 may be a transparent sheet or transparent material having characteristics of light transmittance of 1 to 99%. The light-transmitting support member 150 may simultaneously perform a support function of an existing PCB and a function of transmitting a portion of light passing through the light guide unit 130 in a downward direction. In particular, in this case, when the light-transmitting support member 150 has ductility by including the light guide unit 130 made of a resin so that a film member having flexibility can be used as the light-transmitting support member 150, the present device may have flexible characteristics and thus may be used in various installation places. The light-emitting device 114 may be located on the light-transmitting support member 150.

The light guide unit 130 may include a light curing type resin layer, such as an ultraviolet curing resin, or a thermal curing type resin layer. For example, the light guide unit 130 may be formed of an acryl resin. However, embodiments of the present invention are not limited thereto. In addition, the light guide unit 130 may be formed of resin having flexibility that is capable of performing a light guide function, such as polystyrene (PS), polymethyl methacrylate (PMMA), a cyclic olefin copolymer (COC), polyethylene terephthalate (PET), or high transmission plastics, such as resin. Alternatively, the light guide unit 130 may be formed of an ultraviolet curable resin including oligomer. In more detail, the resin layer may be formed using a resin having a main component of urethane acrylate oligomer. For example, the resin layer may include a resin in which the urethane acrylate oligomer as a synthesized oligomer and polymer as polyacryl are mixed with each other. Of course, the resin layer may further include a monomer in which isobornyl acrylate (IBOA) as a low boiling point dilution type reactive monomer, hydroxylpropyl acrylate (HPA) and 2-hydroxyethyl acrylate (2-HEA) are mixed with each other. In this case, a photoinitiator, for example, 1-hydroxycyclohexyl phenyl-ketone, or an antioxidant may be mixed as an additive. However, the above-described description is just an example. In addition, the resin layer according to the present invention can be formed using all resins that can perform a light diffusion function and that can be realized according to development of technology that has been currently developed and commercialized or can be realized according to further technological development.

Meanwhile, a plurality of beads, in which cavities (or pores) are formed, are mixed and diffused and may be further included in the light guide unit 130 according to the present invention. These beads may improve reflection and diffusion characteristics of light. For example, when light emitted from the light source 130 is incident on the bead inside the resin layer, the light may be reflected and transmitted by the cavities of the beads and may be diffused and concentrated upwards. In this case, reflectivity and diffusibility of light is increased by the beads so that the amount of light and uniformity of exiting light may be improved and consequentially brightness of the lighting device may be improved. The content of the beads may be properly adjusted so as to attain desired light diffusion effects. In more detail, the content of the beads may be controlled in the range of 0.01 to 0.3% based on the total weight of the resin layer. However, embodiments of the present invention are not limited thereto. These beads may be ones selected from silicon, silica, glass bubble, PMMA, urethane, zinc (Zn), zirconium (Zr), $Al_2O_3$, and acryl. A particle diameter of the beads may be in the range of 1 to 20 μm. However, embodiments of the present invention are not limited thereto.

When, in the present device, the light guide unit 130 is implemented to have ductility using resin due to the existence of the resin layer, a thickness of a light guide plate according to the related art can be innovatively reduced so that a thin width of the entire product may be realized and the light guide unit 130 may have a soft material. Thus, the present device can be easily applied to a curved surface, and a degree of freedom of design can be improved, and the present device can be applied to other flexible displays.

Also, the light-emitting device 114 is a device in which one or more light-emitting devices 114 are arranged on the PCB 112 and emit light. A top view type LED may be applied to the light-emitting device according to the present invention and may transmit light easily into the light guide unit 130. That is, in the present device, the PCB 112 may be located not at the lower portion, but at sides of the light guide unit 130, and the light-transmitting support member 150 may be located at the lower portion of the light guide unit 130 to ensure flexibility and various and versatile LEDs including a top view type LED may be used. That is, a chip scale package (CSP) LED may be used, and the CSP LED may be applied to a car lamp and an interior lamp using high brightness and chips with various sizes. Furthermore, a PCB is eliminated from the lower portion of an existing light guide unit so that the width of the present device can be reduced, and when the CSP LED is used, the thickness of an LED lead frame is not required so that the thickness of the light guide unit, for example, a UV resin, can be reduced and thus a light-emitting portion may be implemented with a smaller size.

In particular, the present device may further include the reflection member 140 between the light-transmitting support member 150 and the light guide unit 130. The reflection member 140 may reflect a portion of light that is emitted from the light source unit 110 and incident onto the light guide unit in order to transmit the light in an upward direction of the light guide unit 130. In this case, the reflection member 140 may transmit a portion of light in such a way that light-transmitting patterns may be implemented on the reflection member 140 and may transmit the other portion of the light in a downward direction. In the embodiment of the present device in which the light-transmitting support member 150 is realized with a transparent material, the reflection member is seen from the outside when the lighting device is not turned on. Thus, the present device has transparent characteristics according to the design of the reflection member, and various designs can be devised even when the lighting device is not turned on according to the design of the reflection member.

The light guide unit 130 may include an extension portion 131 located between the light exiting surface A of the light-emitting device 114 and sides of the reflection member 140. The thickness of the extension portion 131 may be several millimeters. However, embodiments of the inventive concept are not limited thereto.

Figure 2:
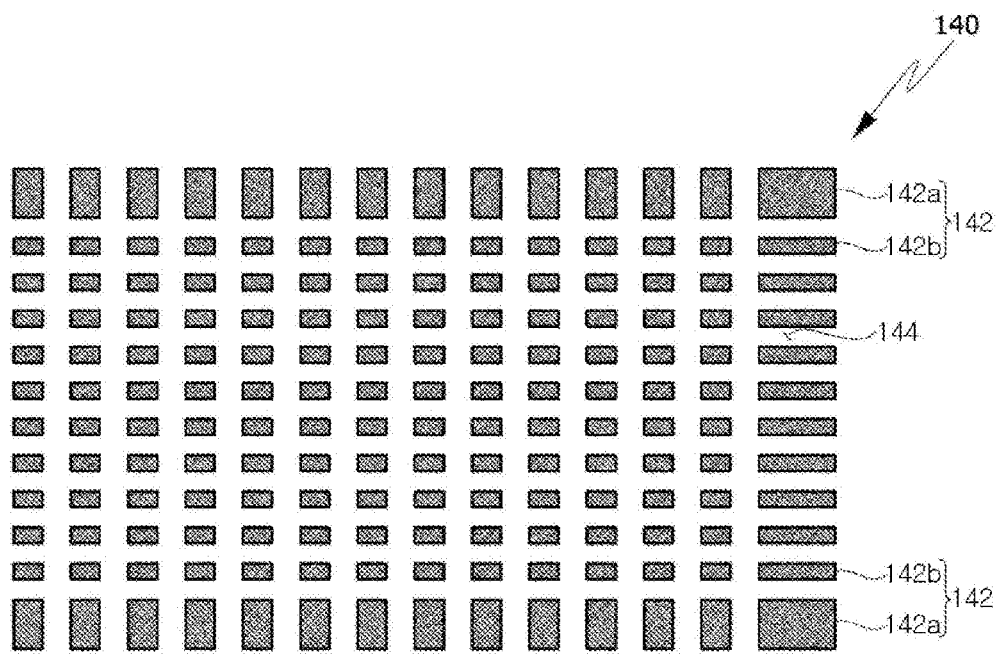
FIGS. 2 and 3 are planar conceptual views of a structure of a reflection member used in the lighting device according to an embodiment of the present invention.
Figure 3:
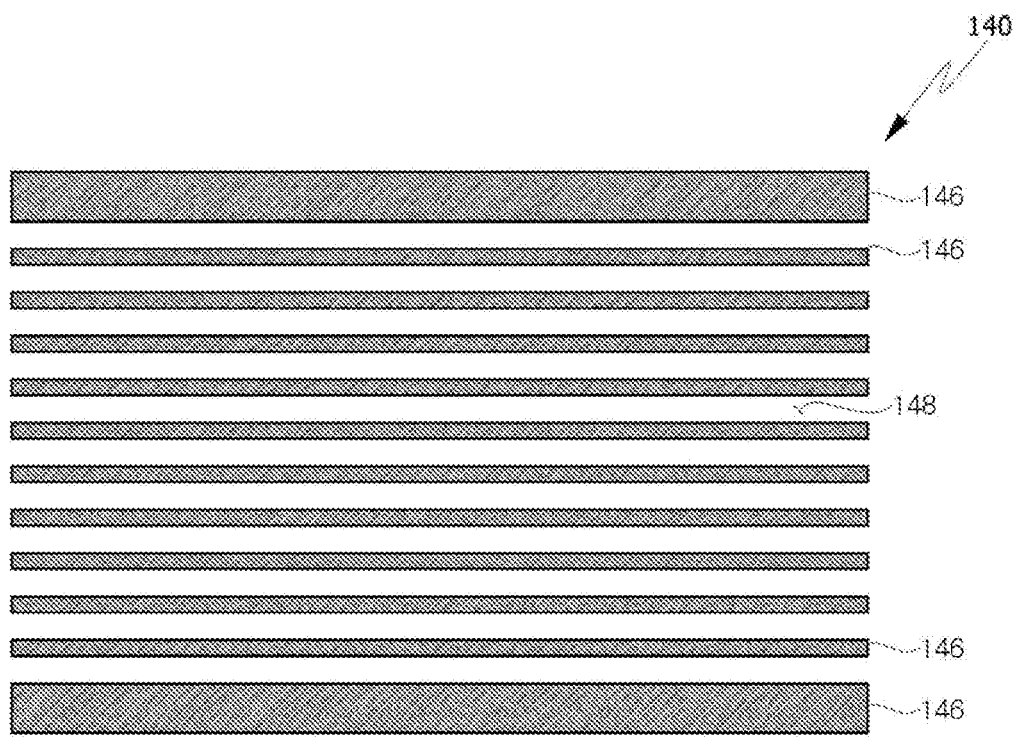

FIGS. 2 and 3 illustrate an implementation example of the reflection member 140. The reflection member 140 may include reflection patterns 142 and 146 that perform a reflection function, and light-transmitting patterns 144 and 148 that transmit a portion of the light. The light-transmitting patterns 144 and 148 may be regions in which the reflection layer is eliminated. However, embodiments of the inventive concept are not limited thereto.

The reflection member 140 may have a film shape and may be formed by including a synthetic resin that disperses a white pigment so as to realize reflection characteristics of light and promotion of diffusion of light. For example, titanium oxide, aluminum oxide, zinc oxide, lead carbonate, barium sulfate, or calcium carbonate may be used for the white pigment, and polyethylene terephthalate, polyethylene naphthalate, acryl resin, colycarbonate, polystyrene, polyolefin, cellulose acetate, or weather-resistant vinyl chloride may be used for the synthetic resin. However, embodiments of the present invention are not limited thereto.

Reflection patterns may be formed on the surface of a reflection portion 142 of the reflection member 140. The reflection patterns scatter and disperse incident light so that the light may be uniformly transmitted to the light converter 120.

Forming of the reflection patterns may be performed by printing on the surface of the reflection member 220 using a reflection ink including one among $TiO_2$, $CaCo_3$, $BaSo4$, $Al_2O_3$ silicon, and PS. However, embodiments of the present invention are not limited thereto. Also, transparent polyethylene terephthalate (PET) instead of a film may be used as the reflection member 140.

The structure of the reflection patterns includes a plurality of protruding patterns. The reflection patterns may have a dot pattern shape, a prism shape, a lenticular shape, a lens shape, or a combination thereof, so as to increase scattering effects of the light. However, embodiments of the present invention are not limited thereto. Also, cross-sectional shapes of the reflection patterns may be a triangular shape, a rectangular shape, a semi-circular shape, a sine wave shape, or the like. Furthermore, the reflection patterns may be formed with uniform or different sizes, and the density of arrangement thereof can be adjusted. That is, the arrangement density of the reflection patterns may be increased by the sizes of the patterns being increased or an interval therebetween being decreased as they move farther away from a light source module. Thus, when the reflection patterns are farther away from the light source, light reflectivity may be increased, and uniformity of the light can be attained.

The area of the light-transmitting patterns 144 and 148 may be 20% to 80% of the entire area of the reflection member 140. When the area is smaller than 20%, a reflection area may be increased so that it is difficult to implement an overall semi-transparent lighting device. Also, when the area is greater than 80%, the reflection area may be decreased so that shapes of stereoscopic images and the reflection patterns are degraded.

In an embodiment, because all of the light converter 120, the light guide unit 130, the reflection member 140 and the light-transmitting support member 150 transmit light, a light-transmitting lighting device may be implemented.

The reflection member 140 may include a plurality of reflection patterns 142 that are spaced apart from one another. In this case, the area of a reflection pattern 142a that is closest to the light-emitting device may be greater than the area of the other reflection patterns 142b. Because a region closest to the light-emitting device has relatively strong light, when the area of the reflection patterns is small in this region, light loss is increased.

Also, the present device may further include the light converter 120 that receives incident light passing through the light guide unit 130 at an upper portion of the light guide unit 130 and transmitted in an upward direction and realizes stereoscopic effects, as shown in FIG. 1.

The light converter 120 includes the light passage portion 122 and the pattern portion 121 including a plurality of unit patterns located on the light passage portion 122. The pattern portion 121 and the light passage portion 122 may be implemented with a structure formed of different materials or as an integral type structure formed of one material.

That is, the light converter 120 may realize light incident through the light exiting surface of the light passage portion 130 as stereoscopic light having a sense of depth or a sense of curvature using the light passage portion 122 and the pattern portion 121. This will be described later.

Figure 4:
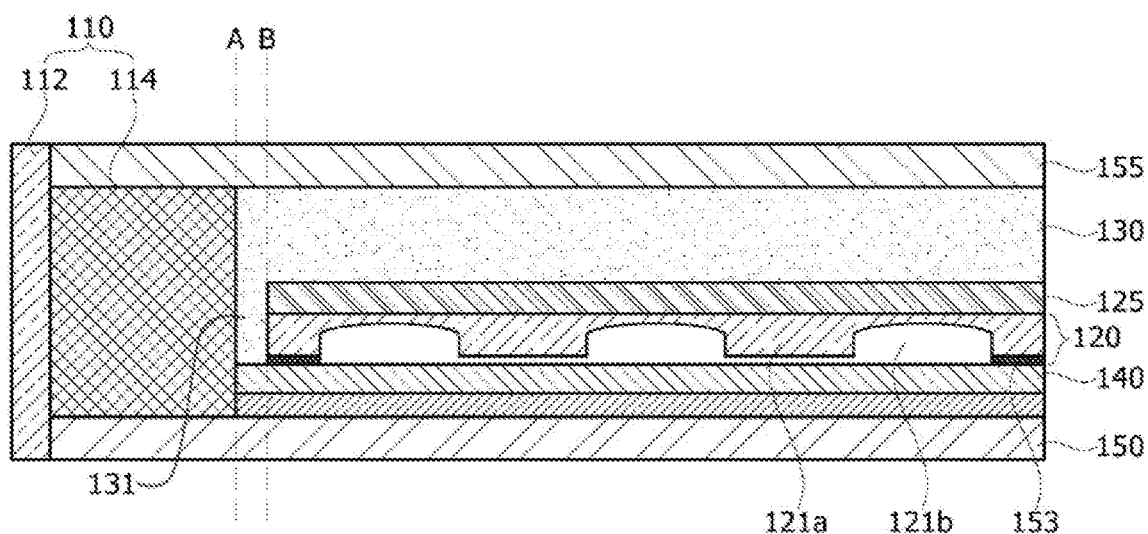
FIG. 4 is a cross-sectional conceptual view of essential portions of a lighting device according to another embodiment of the present invention.

FIG. 4 is a cross-sectional conceptual view of the present device according to another embodiment of the present invention.

A difference between the structure of the present device according to the embodiment of FIG. 4 and the structure of FIG. 1 is that the present device is located at a lower portion of the light passage portion 130 of the light converter 120. In this case, protruding patterns of the pattern portion 121a may be directed in a downward direction of the reflection member 140. In this case, a refractive index of a portion of a space portion 121b, which forms a space between the protruding unit patterns, is different from a refractive index of a peripheral pattern portion so that a stereoscopic light can be more strongly implemented. The light converter 120 is attached to the reflection member 150 via an adhesive pattern 153. In this case, even when the adhesive pattern 153 is formed of a transparent material, the refractive index of the adhesive pattern 153 is different from that of the peripheral pattern portion so that dispersion and scattering of light can be reinforced.

In the structure of FIG. 4, the structure of the light source unit 110 and the main configuration of the light-transmitting support member 150 are the same as in terms of configuration, function of and application of materials of FIG. 1 and thus will be omitted. However, an upper protection film 155 may also be disposed so as to protect the light guide unit 130. The upper protection film 155 may be located on the light-emitting device 114.

Hereinafter, the arrangement and structure of the light converter 120 described above in FIGS. 1 and 4 in which the exiting light implemented in the present device is converted into light having stereoscopic effects, will be described with reference to FIGS. 5 through 12.

As described above in FIG. 1, the present device may further include the light converter 120 that receives incident light passing through the light guide unit 130 at the upper portion of the light guide unit 130 and transmitted upward to realize stereoscopic effects.

The light converter 120 includes the light passage portion 122 and the pattern portion 121 including a plurality of unit patterns located on the light passage portion 122. The pattern portion 121 and the light passage portion 122 may be implemented with structures formed of different materials or as an integral type structure formed of one material.

The light passage portion 122 may be formed of an ultraviolet curing resin including oligomer. In more detail, the light passage portion 122 may be formed of a resin having a main component of urethane acrylate oligomer. That is, the light passage portion 122 may be formed using a resin in which the urethane acrylate oligomer as a synthetic oligomer and polymer as polyacryl are mixed with each other. Of course, the light passage portion 122 may further include a monomer in which IBOA as a low boiling point dilution type reactive monomer, HPA and 2-HEA are mixed with each other. In this case, a photoinitiator or an antioxidant may be mixed in as an additive. The shape of a vertical cross-section of the pattern portion 121 may include a polygonal cross-section shape, including a triangular shape, a semi-circular shape, a semi-elliptical shape, or a pentagonal shape. In the present embodiment, the unit patterns 121 of the light converter 120 may have a cylindrical shape with a semi-circular cross-section, and the light converter 120 or patterns thereof may have an uneven structure in which a plurality of unit patterns each having concave-convex shape and being sequentially arranged in the form of stripes.

Figure 5:
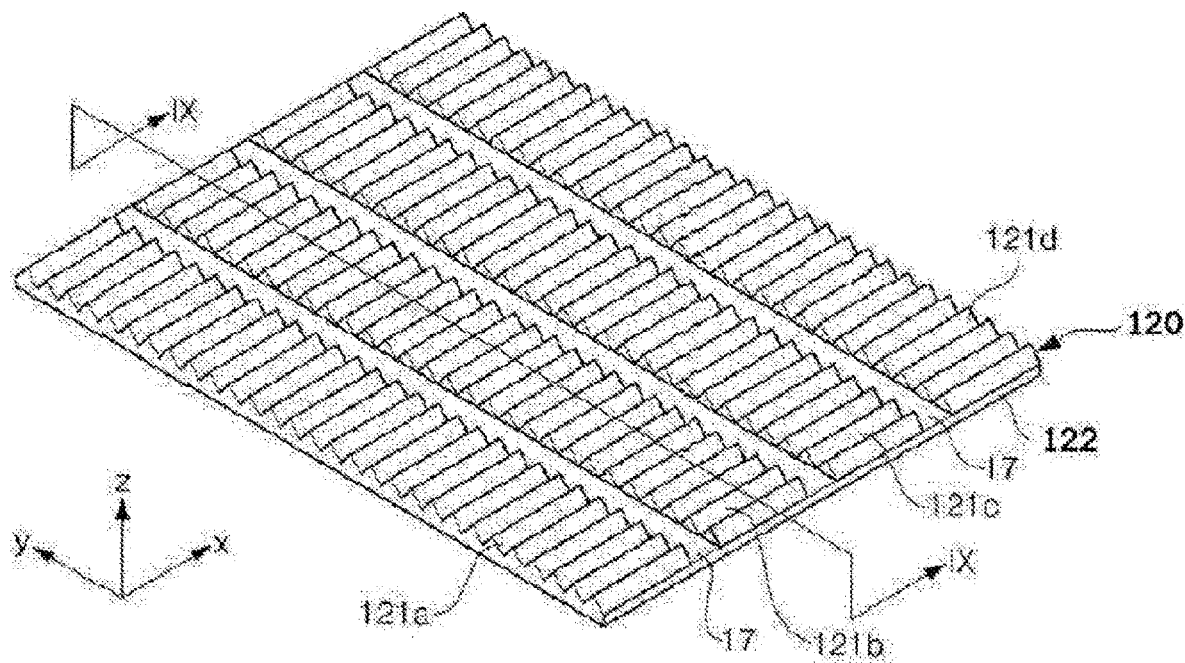
FIG. 5 is an example view of an implementation of a light converter illustrated in FIG. 1.
Figure 6:
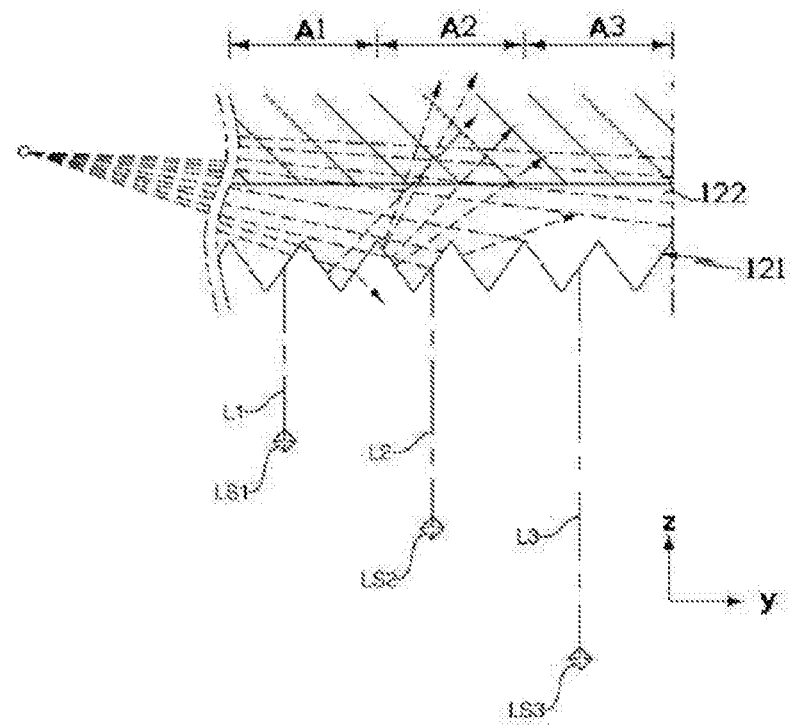
FIG. 6 is a cross-sectional view taken along a line IX-IX of FIG. 5.

FIG. 5 is an example view of an implementation of a light converter described in FIG. 1. FIG. 6 is a cross-sectional view taken along a line IX-IX of FIG. 5.

The light converter 120 used in the lighting device according to the current embodiment includes the light passage portion 122 having a flat plate or film shape and a plurality of unit patterns 121a to 121d that are sequentially arranged on one surface of the light passage portion 122 in a y-direction. The light converter 120 receives light emitted from the light passage portion located at a lower portion of the light converter 120 and realizes a stereoscopic light.

The light source unit (see 110 of FIG. 1) emits exiting light toward the light guide unit 130 in FIG. 1. The light guide unit 130 may emit light in the form of surface emission onto the light passage portion 122 in a direction in which a single incident light BL with a predetermined width crosses an x-y plane. If one single incident light BL among lights emitted from the light exiting surface of the light passage portion is assumed, a width in an x-direction may be similar to the entire width of the light passage portion 122 in a pattern extension direction of any one unit pattern.

The light converter 120 may be implemented to include a plurality of unit patterns 121a, 121b, 121c, and 121d provided in different regions of the light passage portion 122. Of course, the unit patterns may also be implemented on the light passage portion in the form of one stripe. However, in the present embodiment, the light converter 120 may be implemented with the structure of FIG. 5. The light converter 120 may also be implemented to implement a separation portion 17 between four groups of patterns.

In more detail, the pattern 121a, 121b, 121c, or 121d of each group of the light converter 120 may have a shape in which a plurality of prism bars including a first flat surface, a second flat surface and a third flat surface are sequentially arranged parallel to one another. Each of unit patterns of each group has a shape of a prism bar of which a lateral direction extends in the x-direction, and the first flat surface of the unit pattern is in contact with one surface of the light passage portion 122, and second and third main flat surfaces of the unit pattern may be arranged repeatedly with second and third flat surfaces of another adjacent pattern, thereby forming an uneven shape.

The patterns 121a, 121b, 121c, and 121d of four groups may process one surface of a single light passage portion 122 and may be formed as an integral type. When a first flat surface of a unit pattern of each group is a flat surface arranged in parallel on one surface of the light passage portion 122, the first flat surface is a virtual flat surface that is integrally in contact with the light passage portion 122.

The second flat surface and the third flat surface of the unit pattern are inclined planes having a predetermined inclination angle with respect to the first flat surface or the second flat surface of the light passage portion 122. The second flat surface and the third flat surface of the unit pattern, which are flat surfaces having an inclination angle inclined with respect to one surface of the light passage portion 122, limit incident light passing through the light passage portion 122 to a first path by refraction and reflection on the inclined planes and induce the light to realize a linear light.

That is, the incident light that moves inside the light passage portion 122 and is refracted and reflected on the inclined planes of the unit patterns passes through a first region A1 in which incident light is directly irradiated, a second region A2, extends to a third region A3 and is emitted in a direction of the first flat surface or the second flat surface of the light passage portion 122. In this case, the incident light is converted into the linear light on the first path due to the arrangement direction of a plurality of unit patterns and an indirect light source effect.

In order to attain reflection or refraction performance with a predetermined value in patterns of the light converter 120, the inclined planes of the unit patterns are glossy or smooth mirror surfaces. Surface roughness Rz of the inclined planes may be measured and calculated based on ten-point average roughness that uses a difference between an average height of five highest peaks and an average depth of five deepest valleys in a cross-section curve with respect to a reflected surface. The surface roughness may be designed to be about 0.8 μm or less, preferably, 0.4 μm or less, more preferably, 0.1 μm or less based on a reference length of 0.25 mm. When the surface roughness exceeds a predetermined value (for example, 0.8 μm), a desired reflection or refraction performance with respect to each pattern is reduced to be a predetermined level or less such that desired light images cannot be properly implemented.

The separation portion 17 is provided as a region which extends in a direction parallel to a direction in which the linear light on the first path moves and in which no patterns are formed between patterns of two adjacent groups. That is, the separation portion 17 may extend from the first flat surface of the light passage portion 122 in a y-direction and may have a predetermined width. The separation portion 17 may be simultaneously formed with the patterns 121a, 121b, 121c, and 121d of the light converter 120 while processing one surface of the single light passage portion 122 so as to form patterns of a plurality of groups of the light converter 120.

When, by using the separation portion 17, light having a single light width is irradiated in the x-direction on an intermediate portion of the second flat surface of the light passage portion 122 in a direction that is orthogonal to or crosses a thickness direction (z-direction) of the light passage portion 122, the incident light incident on the light passage portion 122 may be converted into four pairs of linear lights that are separate from one another and may be expressed by patterns of a plurality of groups and displayed. The four pairs of linear lights refer to a plurality of linear lights that each proceed in a +y-direction and a −y-direction based on a central portion from an approximately middle portion of the light passage portion 122.

Linear lights having stereoscopic effects will now be described in more detail.

Referring to FIG. 6, when light that is surface-emitted from the light exiting surface as a top surface of the light guide unit 130 is considered in the structure of FIG. 1, the incident light incident onto the first region A1 that is the middle portion of the double light passage portion 122, is reflected inside the light passage portion 122 and moves from one side to the other side. In this case, the patterns 121 of the light converter 120 on one surface of the light passage portion 122 refract or reflect the incident light to change a travelling direction. Thus, the incident light is emitted in a direction of a first flat surface 111 of the light passage portion 122 or in a direction of a second flat surface that is an opposite side to the first flat surface.

Here, the plurality of unit patterns sequentially arranged serve as indirect light sources of which an optical path is gradually increased from the first region A1 to the third region A3 through reflection and refraction of the incident light. Thus, a first incident light that proceeds from the middle portion of the light passage portion 122 to a first side edge, and a second incident light that proceeds from the middle portion of the light passage portion 122 to a second side edge that is opposite to the first side edge, proceed from the first region A1 to the third region A3 by reflection and refraction of the unit patterns on each inclined plane and are converted into linear lights emitted to the outside of the light passage portion 122 by indirect light sources having a shape of point light sources sequentially arranged such that the length of the optical path is increased. The linear lights are indirect light sources located farther from an external reference point or an observation point as the optical path is increased. Thus, the linear lights are expressed as linear lights having stereoscopic effects with a sense of depth in the proceeding direction.

In other words, when a first indirect light source LS1 caused by a first unit pattern located in the first region A1 of the light passage portion 122 is observed to be located at a first distance L1 from the first unit pattern, a second indirect light source LS2 caused by a second unit pattern located in the second region A2 is observed to be located at a second distance L2 farther than the first distance L1, and a third indirect light source LS3 caused by a third unit pattern located in the third region A3 is observed to be located at a third distance L3 farther than the second distance L2. An intensity of light of the second indirect light source LS2 is lower than the intensity of light of the first indirect light source LS1 and is higher than the intensity of light of the third indirect light source LS3 according to a distance between optical paths from the same light source.

According to the above-described configuration, light images can be realized using the linear lights with stereoscopic effects in which distance vector components in a direction orthogonal to a pattern arrangement plane (first flat surface) or the second flat surface 112 of the light passage portion 122 from an external reference point are increased and brightness is reduced.

Figure 7:
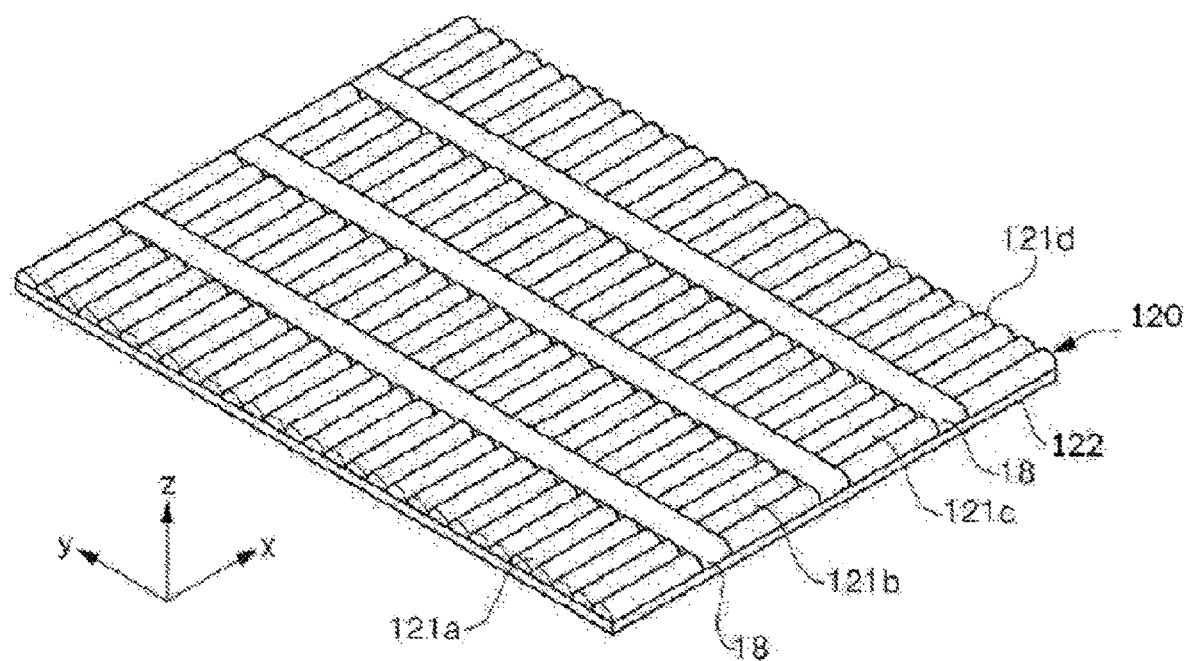
FIG. 7 is a perspective view of a lighting device according to another embodiment of the present invention.

FIG. 7 is a perspective view of a lighting device according to another embodiment of the present invention.

Referring to FIG. 7, the lighting device according to the present embodiment includes the light passage portion 122, the light converter 120, and a light source unit. The light converter 120 may be implemented in a structure including patterns of a plurality of groups sequentially arranged in the y-direction in different regions of the light passage portion 122 and barrier walls 18 that extend in the y-direction of the light passage portion 122 between adjacent pattern groups.

In the lighting device according to the present embodiment, when light is irradiated on the middle portion of the light passage portion 122 in the y-direction in a vertical direction (z-direction) of the light passage portion 122 or in a direction inclined with respect to the thickness direction, the incident light inside the light passage portion 122 may be converted into four pairs of linear lights that are refracted and reflected by patterns of four groups and extend along a pattern arrangement direction of each group of the light converter 120.

The light converter 120 may be provided in such a way that a portion of one surface of the light passage portion 122 is eliminated. However, embodiments of the inventive concept are not limited thereto, and the light converter 120 may be provided by bonding an additional pattern layer having a plurality of patterns onto one surface of the light passage portion 122. In this case, the refractive index of the pattern layer may be designed to be the same as the refractive index of the light passage portion 122 or to have a predetermined refractive index difference (about 0.2 or less).

Each pattern group of the light converter 120 includes unit patterns 121a, 121b, 121c, and 121d having bar shapes. A unit pattern of each pattern group has a semi-cylindrical bar shape with semi-circumferential surfaces and a planar surface facing the semi-circumferential surface. Here, the planar portions of the semi-cylindrical bar shape may be arranged in contact with one surface of the light passage portion, and the semi-circumferential surfaces thereof may be sequentially arranged in parallel in the y-direction.

The barrier walls 18, in which no patterns of the light converter 120 are provided, may be provided as a portion of the light converter 120 or by placing an additional member between pattern groups. The barrier walls 18 may be formed of materials having a different refractive index and a different color from those of the light passage portion 122 or the light converter 120. By using the barrier walls 18, a single incident light can be separated and expressed as a plurality of linear lights.

According to the present embodiment, when light is irradiated on the middle portion of the light passage portion in one direction in the thickness direction of the light passage portion or in a direction inclined with respect to the thickness direction, incident light inside the light passage portion is induced in the direction of the first flat surface or the direction of the second flat surface by sequential reflection and refraction of the unit patterns on each inclined surface so that a plurality of linear lights on the first path orthogonal to each pattern arrangement direction of the unit patterns may be realized. The plurality of linear lights may include at least a pair of linear lights that proceed from the middle portion of the light passage portion to both sides of the middle portion.

Figure 8:
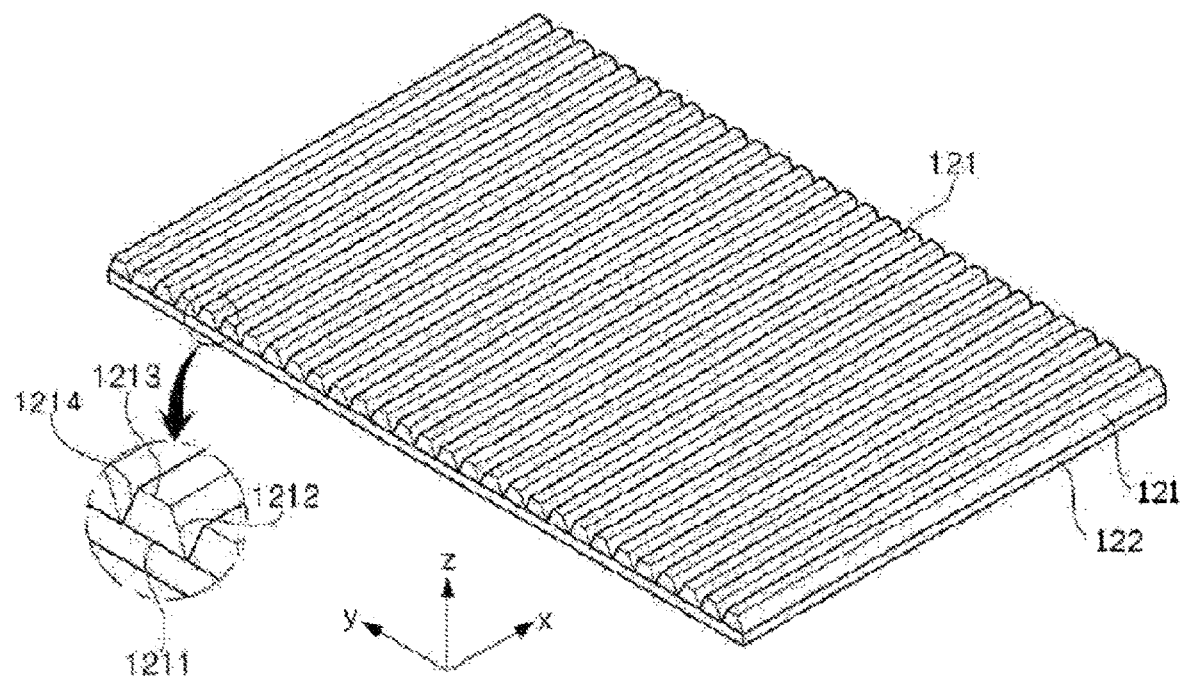
FIG. 8 is a view of a light converter according to another embodiment of the present invention.

FIG. 8 illustrates a light converter according to another embodiment of the present invention.

In this case, the light converter 120 includes patterns that extend in the x-direction of the light passage portion 122 and are sequentially arranged in the y-direction. That is, in the lighting device according to the present embodiment, the light converter 120 includes a plurality of unit patterns 121 of a single group which are not divided into patterns of a plurality of groups by the separation portion or barrier walls and in which there are no separation portions or barrier walls that extend in a pattern arrangement direction in the middle of a pattern extension direction.

Because the structure and the operation of the above-described light converter are substantially the same as the above-described light converter 120 except for the pattern structure of the above-described light converter 120, a detailed description of the same or similar components will be described.

In the current embodiment, a unit pattern 121 of the light converter 120 has a rectangular bar shape with a first flat surface 1211, a second flat surface 1212, a third flat surface 1213, and a fourth flat surface 1214, or a trapezoid cross-sectional shape. A lengthwise direction of the plurality of unit patterns 121 at one surface of the light passage portion 122 is extended in the x-direction (a pattern extension direction), and the plurality of unit patterns 121 are repeatedly and sequentially arranged in the y-direction.

In the unit patterns 121, the first flat surface 1211 may be placed parallel to the first flat surface or second flat surface of the light passage portion 122. The second flat surface 1213 may be parallel to the first flat surface 1211 or not. The third flat surface 1212 and the fourth flat surface 1214 may be an inclined surface with a predetermined inclination angle with respect to the first flat surface 1211.

When the third flat surface 1213 is located parallel to the second flat surface or the pattern arrangement plane of the light passage portion 122, the third flat surface 1213 within the light converter 120 may not function as an indirect light source but may be a portion that cuts off a linear light (hereinafter, referred to as a cutoff portion). The cutoff portion may be properly used to realize light images in the form of dot-shaped linear lights. When continuous linear lights are realized, the cutoff portion may be set to be 10 μm or less.

When the third flat surface 1213 is disposed to not be parallel to the pattern arrangement plane of the light passage portion 122 and to have a predetermined inclination angle with respect to the pattern arrangement plane of the light passage portion 122, the third flat surface 1213 may be an inclined flat surface that refracts and reflects incident light together with the second flat surface 1212 or the fourth flat surface 1214 to induce the incident light in the direction of the first flat surface or the direction of the second flat surface of the light passage portion 122.

A lighting device 10F according to the present embodiment may include a light source having a plurality of LED devices that are arranged in the x-direction and irradiate a plurality of lights onto the middle portion in the y-direction. In this case, the lighting device 10F may realize light images including a plurality of pairs of stereoscopic effect linear lights that proceed from the middle portion in the y-direction toward both sides by using single patterns of the light converter 120 similar to the lighting device of FIG. 8 or 11.

Meanwhile, the lighting device 10F including a plurality of unit patterns 121 according to the present embodiment has a structure in which pattern extension directions of the plurality of unit patterns 121 extend parallel to each other in the x-direction. However, embodiments of the present invention are not limited thereto. For example, the lighting device 10F may include a plurality of unit patterns designed in such a way that, in a modified embodiment, a cross-section width of at least one unit pattern is gradually increased from one end to the other end in the x-direction of the unit pattern, whereby an optical path is broken or gently bent based on a certain point of one end in the x-direction.

In the current embodiment, when light is irradiated onto the middle portion in one direction of the light passage portion in a thickness direction of the light passage portion or a direction inclined with respect to the thickness direction, incident light inside the light passage portion is induced in the direction of the first flat surface or the second flat surface of the light passage portion due to sequential reflection and refraction at each inclined flat surface of the unit patterns so that linear lights on first paths which extend in a direction orthogonal to each pattern extension direction of the unit patterns may be realized.

Figure 9:
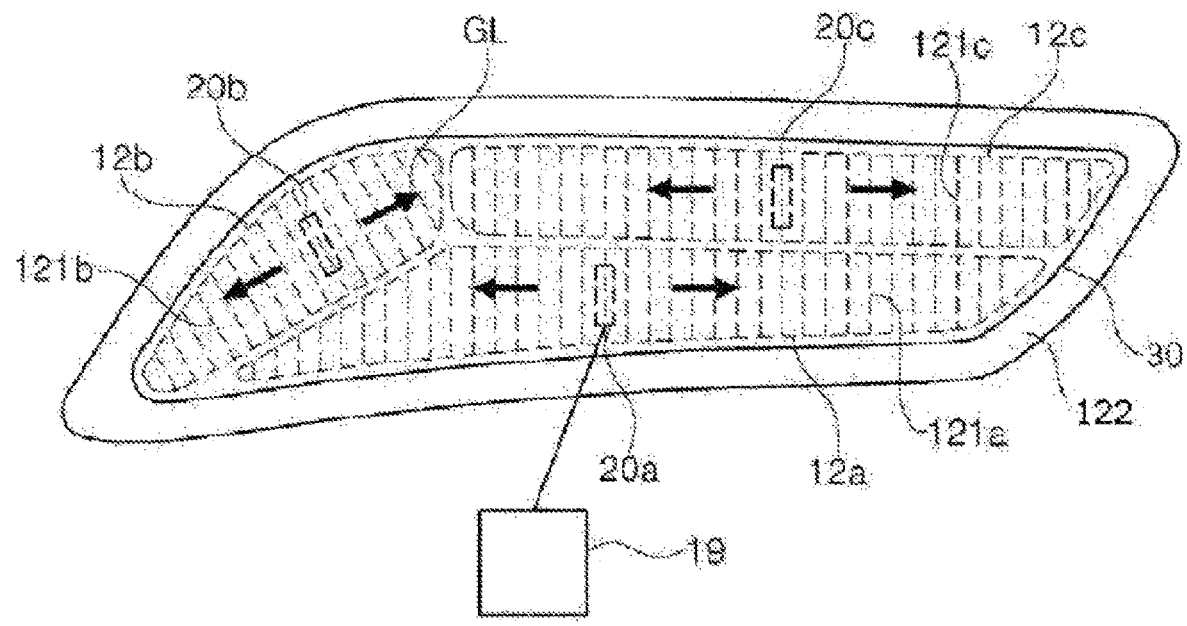
FIG. 9 is a plan view of a lighting device according to another embodiment of the present invention.

FIG. 9 is a plan view of a lighting device according to another embodiment of the present invention.

Referring to FIG. 9, the lighting device according to the present embodiment may be realized with a car lamp including first through third light converters 12a, 12b, and 12c, first through third light source units 20a, 20b, and 20c, and an outer lens 30.

A light passage portion 122 is provided to have a shape of a predetermined car lamp when viewed from a flat surface or front. Here, the car lamp may be one among a headlight, a rear light, an indoor light, a door scarf, and a fog light. However, embodiments of the present invention are not limited thereto. The light passage portion 122 may be equal to the light passage portion of FIG. 5, 8, or 9 except for a shape thereof.

The first light converter 12a is provided in a first region of the light passage portion 122. A plurality of unit patterns 121a of the first light converter 12a extend in a first A-direction from the first region and are sequentially arranged in a first B-direction that crosses or is orthogonal to the first A-direction. The unit patterns 121a include an inclined flat surface having a first inclination angle with respect to the pattern arrangement plane of the light passage portion 122 in the first B-direction.

The second light converter 12b is provided in a second region of the light passage portion 122. The second region may not overlap the first region. The plurality of unit patterns 121b of the second light converter 12b extend in a second A-direction from the second region and are sequentially arranged in a second B-direction that crosses or is orthogonal to the second A-direction. The second A-direction may not be parallel to the first A-direction, and the second B-direction may not be parallel to the first B-direction. The unit patterns 121b include an inclined plane having a second inclination angle with respect to the pattern arrangement plane of the light passage portion 122 in the second B-direction. The second inclination angle may be equal to or different from the first inclination angle.

The third light converter 12c is provided in a third region of the light passage portion 122. The third region may not overlap the first region and the second region. The plurality of unit patterns 121c of the third light converter 12c extend in a third A-direction from the third region and are sequentially arranged in a third B-direction that crosses or is orthogonal to the third A-direction. The third A-direction may not be parallel to the first A-direction or the second A-direction, and the third B-direction may not be parallel to the first B-direction or the second B-direction. The unit patterns 121c include an inclined plane having a third inclination angle with respect to the pattern arrangement plane of the light passage portion 122 in the third B-direction. The third inclination angle may be equal to or different from at least one of the first inclination angle and the second inclination angle.

A first light source unit 20a is located to irradiate light onto the middle portion of the first region. The first region of the light passage portion 122 may be inclined or bent with respect to the first light source unit 20a (see FIGS. 7 and 9). A second light source unit 20b is located to irradiate light onto the middle portion of the second region. The second region of the light passage portion 122 may be inclined or bent with respect to the second light source unit 20b. A third light source unit 20c is located to irradiate light onto the middle portion of the third region. The third region of the light passage portion 122 may be inclined or bent with respect to the third light source unit 20c.

Each of the above-described first through third light source units 20a, 20b and 20c may include a light source supported on one surface of the lens 30 by a housing of the lighting device to which the outer lens 30 is coupled. Here, at least one light source among the first through third light source units 20a, 20b and 20c may be at least one stereoscopic effect optical module together with the light passage portion 122 and the light converter. At least one among the first through third light converters 12a, 12b, and 12c and at least one optical member including at least a portion of the light passage portion 122 may be bonded onto one surface of the outer lens 30 or placed on one surface of the lens 30. When the lighting device is realized with a car lamp, each light source unit may be connected to a vehicle battery 19 and may operate due to power of the vehicle battery.

When each of the first through third light source units 20a, 20b and 20c includes a flexible printed circuit board and forms the light passage portion 122 using a resin layer, the lighting device 10G may be bonded onto one surface of the outer lens 20 having a curved surface or may be bent with an inflection point of at least one or more according to the curved surface of the outer lens 20.

According to the above-described configuration, when light of each of the light source units 20a, 20b and 20c is irradiated onto the middle portion of each region of the light passage portion in the thickness direction of the light passage portion 122 or in the direction inclined with respect to the thickness direction of the light passage portion 122, the unit patterns 121a, 121b, and 121c of each light converter guide and limit incident light in both directions of the pattern arrangement direction and express linear lights GL. Of course, the first through third light converters may realize linear lights that extend in one direction (not in both directions of the pattern arrangement direction) according to a relative arrangement design with light sources.

In addition, according to the present embodiment, in the lighting device 10G, at least one among a first optical member portion including the light passage portion 122 and the first light converter 12a, a second optical member portion including the light passage portion 122 and the second light converter 12b, and a third optical member portion including the light passage portion 122 and the third light converter 12c may have curvature or may be bent to have a curved surface.

Figure 10:
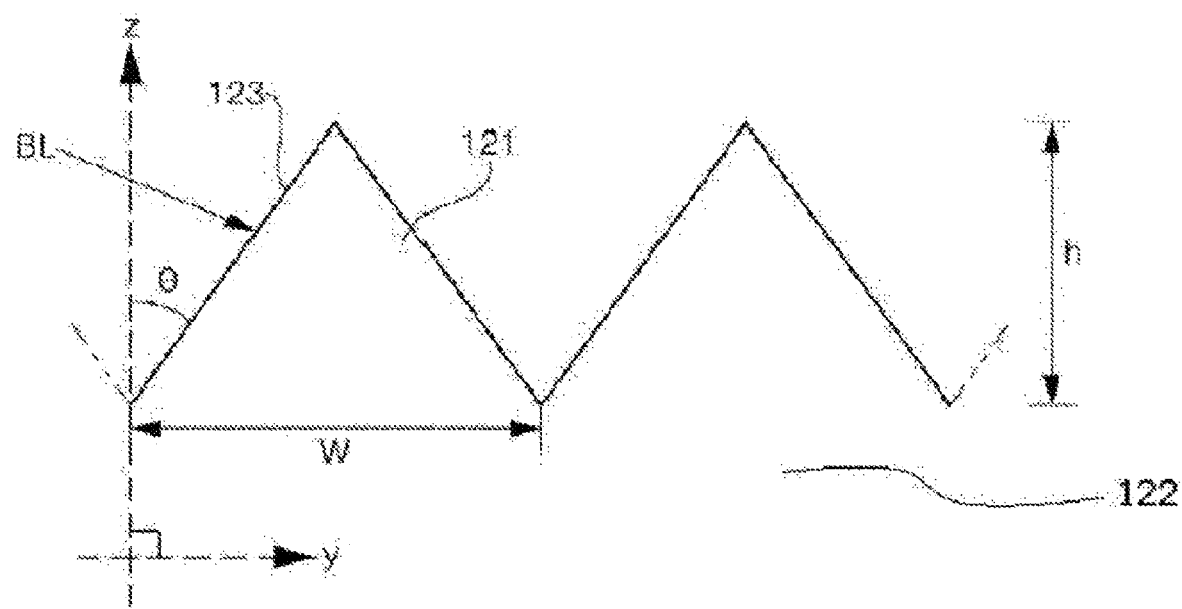
FIGS. 10 through 12 are example views of pattern structures that may be employed in the lighting device according to the present invention.
Figure 11:
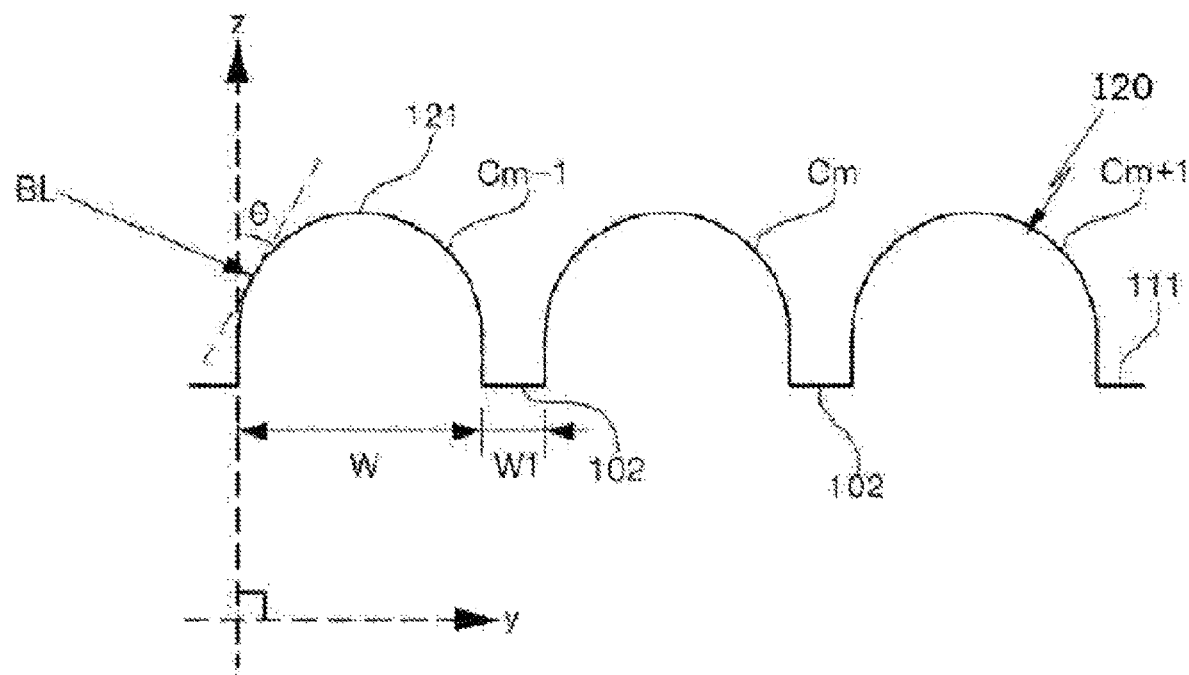
Figure 12:
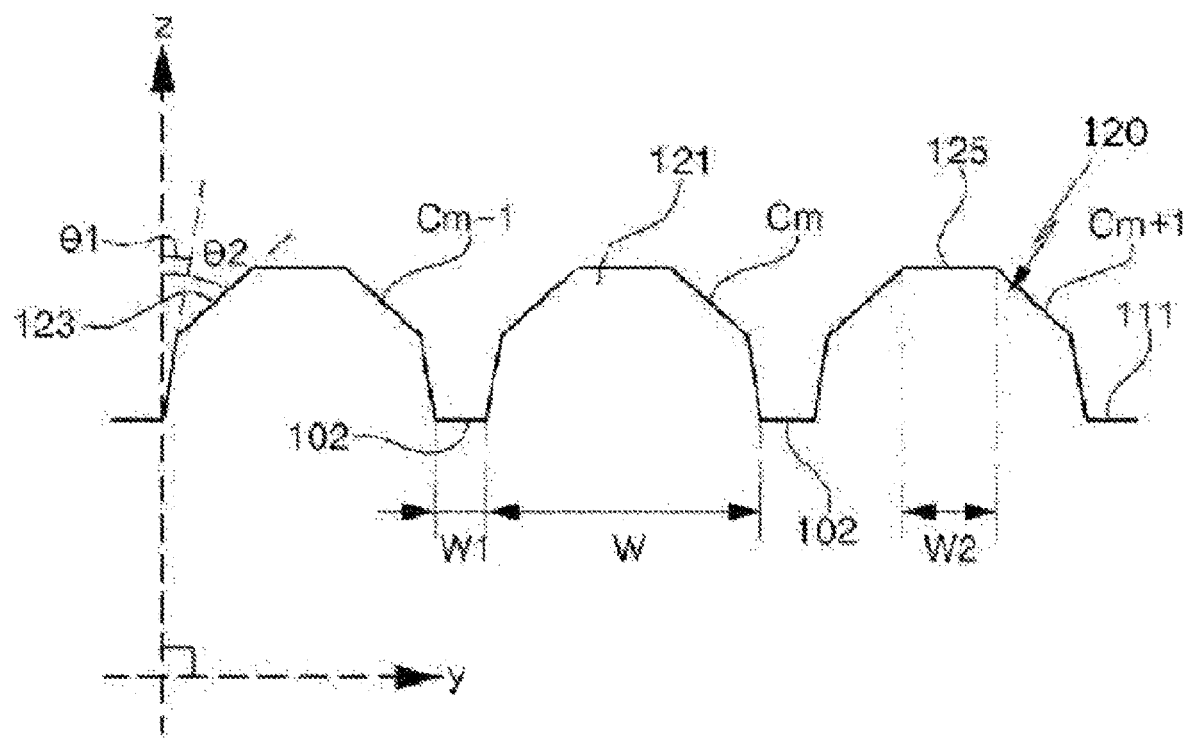

FIGS. 10 through 12 are example views of pattern structures that may be employed in the lighting device according to the present invention.

Referring to FIG. 10, a light converter of the lighting device according to the present embodiment includes patterns, and the patterns include a plurality of unit patterns 121. The plurality of unit patterns 121 may have a triangular cross-section shape.

In this case, when the unit patterns 121 have a triangular cross-section shape, an inclined plane 123 of the unit patterns 121 may have a predetermined inclination angle with respect to a first flat surface or a pattern arrangement plane. In other words, the inclined plane 123 may include an inclination angle θ with respect to a z-direction that is orthogonal to the pattern arrangement plane.

The inclination angle θ may be greater than about 5° and less than about 85°. The inclination angle θ may be further limited in consideration of a refractive index of the light passage portion. However, basically, the inclination angle θ may be suitably designed in the range of about 5° to about 85° in consideration of reflection and refraction at a predetermined level on the inclined plane 123.

In this case, when the refractive index of the light passage portion 122 is about 1.30 to about 1.80, an inclination angle of the inclined plane 123 of one side of the unit pattern 121 may be greater than 33.7° and less than 50.3° or may be greater than 49.7° and less than 56.3° according to a reference direction (z-direction or y-direction).

In addition, the optical member including the light passage portion and the plurality of unit patterns may be provided using a material having a high refractive index. For example, in the manufacturing of a high-luminosity LED, when light having a particular incidence angle passes through a semiconductor die and transmits through a capsule material, the light is internally reflected due to a difference between n-values (refractive indices) of the semiconductor die (where n=2.50 to 3.50) and a general polymer capsule device (where n=1.40 to 1.60). Thus, light extraction efficiency is lowered. In order to properly solve this problem, polymer having high refractive indices (where n=1.80 to 2.50) is used. In the current embodiment, the optical member may be provided by utilizing the polymer having high refractive indices (where n=1.80 to 2.50) used to manufacture the high-luminosity LED. In this case, the inclination angle of the inclined plane 123 of the unit patterns 121 according to the current embodiment may be greater than 23.6° and less than about 56.3° or may be greater than 33.7° and less than 66.4° according to the refractive index of the optical member.

Also, according to implementations, at least one high-refractive index function layer may be coated on a plurality of patterns so as to adjust the refractive indices.

The inclination angle according to the above-described refractive indices is in accordance with Snell's law and is expressed as the following Equation 1:

$$\frac{\sin\theta_1}{\sin\theta_2} = \frac{n2}{n1} \qquad \text{Equation 1}$$

In Equation 1, $\sin\theta_1$ is a proceeding angle or incidence angle of light in a first medium having a first refractive index n1, and $\sin\theta_2$ is an incidence angle or proceeding angle of light in a second medium having a second refractive index n2.

As described above, the inclined plane of the unit patterns according to the present embodiment may be provided to have an inclination angle θ from about 5° to 85° that is an inclination angle at which the incident light can be properly reflected or refracted. In an embodiment, in the unit patterns 121, the ratio of a width w to a height h of a bottom side may be limited to a predetermined ratio for convenience of a manufacturing process in addition to the above-described inclined plane. The width of the bottom side may correspond to a period or pitch of the unit patterns.

For example, when patterns of the light converter are designed so that the stereoscopic effects of the linear lights can be emphasized, the width w of the unit patterns 121 may be less than or equal to the height h of the unit patterns. Also, when the patterns of the light converter are designed so that the linear lights may express relatively long images, the width w of the unit patterns may be greater than the height h of the unit patterns. Also, when the unit patterns 121 have a lenticular shape, the ratio h/w of the width to the height of the unit patterns 121 may be equal or less than about ½, and/or the inclination angle θ of the inclined plane may be equal to or less than about 45°.

In this way, in the current embodiment, light images of linear lights or stereoscopic effect lights with a desired design can be effectively controlled using the width w and the height h of the unit patterns 22 as characteristic-adjusting factors.

In the current embodiment, the width w (that corresponds to a pitch) between two adjacent unit patterns within the light converter 120 may be 10 μm to 500 μm. The width w may be an average distance between a plurality of patterns on a first path and may be adjusted according to a pattern design or a desired optical image shape.

Referring to FIG. 11, when patterns of the light converter 120 of the lighting device according to the present embodiment are designed, the plurality of unit patterns 121 may be provided to have a semi-circular or semi-elliptical cross-section shape. The unit patterns 121 include an inclined plane inclined at a predetermined angle in the thickness direction (z-direction) of the light passage portion or the y-direction. The unit patterns 121 may have a symmetric shape based on a central line (not shown) in the z-direction. However, embodiments of the present invention are not limited thereto.

In the current embodiment, the inclined plane of the unit patterns 121 may be considered as a virtual inclined plane on a straight line circumscribed in a semi-circular cross-section structure of the unit patterns. The inclined plane may have an inclination angle θ that is greater than 0° and less than 90° that varies along a semi-circular outer surface. That is, the inclined plane of the unit patterns 121 may be an inclined plane that contacts an arbitrary point in an approximately semicircular arc and thus may have an inclination angle θ of all acute angles.

In addition, the light converter 120 according to the current embodiment may include a separation portion 102 between two adjacent unit patterns. That is, when the plurality of unit patterns 121 include a first unit pattern Cm−1, a second unit pattern Cm and a third unit pattern Cm+1 (where m is a natural number that is equal to or greater than two or more), the light converter 120 may include the separation portion 102 between the first unit pattern Cm−1 and the second unit pattern Cm and between the second unit pattern Cm and the third unit pattern Cm+1.

The separation portion 102 that is a unit in which unit patterns are not formed on the first flat surface 111 of the light passage portion may be a portion of the first flat surface 111 located between two adjacent unit patters. Also, the separation portion 102 that is a gap between two adjacent unit patterns may be provided for convenience of a manufacturing process. The separation portion 102 may be omitted according to the manufacturing process or a pattern design of particular implementation.

A second width w1 of the separation portion 102 is less than a first width w of the unit pattern 121. The first width w1 of the separation portion 102 may be equal to the first width w of the unit pattern 121. The first width w1 of the separation portion 102 may be equal to or less than about $1/5^{th}$ of the first width w of the unit pattern 121 or may be equal to or less than several micrometers. In this case, the period or pitch of the unit patterns may correspond to a value obtained by adding the first width w and the second width w1 to the unit patterns.

Referring to FIG. 12, when the pattern design of the light converter 12 of the lighting device according to the present embodiment is performed, each unit pattern 121 may have a polygonal cross-section shape. An inclined plane 123 of the unit pattern 121 may have a shape of a bent line graph.

In the current embodiment, the inclined plane 123 of the unit pattern 121 may be provided to have a plurality of inclination angles θ1 and θ2 according to the number of segments of the bent line graph in a direction (z-direction) orthogonal to the first flat surface 111 of the light passage portion. The second inclination angle θ2 may be greater than the first inclination angle θ1. The first and second inclination angles θ1 and θ2 may be designed in the range that is greater than about 5° and less than about 85°.

In addition, the light converter 120 according to the present embodiment may further include the separation portion 102 between two adjacent unit patterns. The width w1 of the separation portion 102 is less than the width w of the unit pattern so that natural linear lights on the light converter 12 can be realized. The width w1 of the separation portion 102 is designed to be equal to or less than several micrometers. The width w1 of the separation portion 102 may be designed as small as possible, or the separation portion 102 may be designed by omitting the width w1 itself.

In addition, the light converter 120 according to the present embodiment may include a cutoff plane 125 parallel to the first flat surface 111 on the unit pattern 121. The cutoff plane 125, from which incident light is not substantially emitted to the outside through reflection or refraction, may be cutoff and expressed in a portion where linear lights realized by the plurality of unit patterns correspond to the cutoff plane 125. Thus, the width w2 of the cutoff plane 125 may be properly designed in the range that is equal to or less than several micrometers so that linear lights having a desired shape can be implemented.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A lighting device comprising:
a light-transmitting support member;
a light guide unit located on the light-transmitting support member;
a light source unit located on sides of the light guide unit; and
a light converter configured to convert light incident on the light guide unit,
wherein the light source unit includes a printed circuit board (PCB) and a light-emitting device located on a first flat surface of the PCB,
wherein the first flat surface of the PCB faces the sides of the light guide unit,
wherein the light-emitting device is located on the light-transmitting support member,
wherein the light converter comprises a light passage portion and a plurality of unit patterns are sequentially arranged on the light passage portion,
wherein the plurality of unit patterns includes an inclined plane inclined with respect to a first flat surface or a second flat surface of the light passage portion, and
wherein the light converter, by reflection and refraction at the inclined plane, induces incident light inside the light guide unit in a first flat surface direction towards which the first flat surface of the light passage portion faces or in a second flat surface direction towards which the second flat surface of the light passage portion faces, thereby implementing linear lights on a first path that is orthogonal in pattern extension directions of the plurality of unit patterns.

2. The lighting device of claim 1, further comprising a reflection member located between the light-transmitting support member and the light guide unit.

3. The lighting device of claim 2, wherein a light exiting surface of the light-emitting device faces a side of the reflection member.

4. The lighting device of claim 3, wherein the light guide unit includes an extension portion located between the light exiting surface of the light-emitting device and the side of the reflection member.

5. The lighting device of claim 1, wherein the light converter is disposed on the light guide unit.

6. The lighting device of claim 2, wherein the light converter is disposed between the light guide unit and the reflection member.

7. The lighting device of claim 1, further comprising a protection film located on the light guide unit, wherein the protection film is located on the light-emitting device.

8. The lighting device of claim 2, wherein the reflection member includes light-transmitting patterns.

9. The lighting device of claim 8, wherein an area of the light-transmitting patterns is 20% to 80% of the entire area of the reflection member.

10. The lighting device of claim 2, wherein the reflection member includes a plurality of reflection patterns spaced apart from one another.

11. The lighting device of claim 10, wherein an area of a reflection pattern closest to the light-emitting device is greater than an area of the other reflection patterns.

12. The lighting device of claim 2, wherein the reflection member comprises a plurality of reflection patterns spaced away in a first direction and a plurality of light-transmitting patterns disposed between the plurality of reflection patterns.

13. The lighting device of claim 2, wherein the reflection member comprises a plurality of reflection patterns and a plurality of light-transmitting patterns,
wherein the plurality of light-transmitting patterns comprises first light-transmitting patterns extending in a first direction and second light-transmitting patterns extending a second direction orthogonal to the first direction, wherein the plurality of reflection patterns is separated by the first light-transmitting patterns and the second light-transmitting patterns.

14. The lighting device of claim 1, wherein the light emits from the light converter and the light-transmitting support member.

15. The lighting device of claim 14, wherein the plurality of unit patterns comprises a plurality of pattern groups arranged in a first direction,
wherein the plurality of pattern groups is spaced away from each other in a second direction orthogonal to the first direction.

16. The lighting device of claim 15, wherein each of the plurality of the unit patterns extends in the second direction.

17. The lighting device of claim 15, wherein the light converter comprises a separation portion disposed between the plurality of pattern groups,
wherein the separation portion comprises a flat surface.

18. The lighting device of claim 1, wherein a surface roughness of the inclined plane is 0.8 µm or less.

19. The lighting device of claim 1, wherein a refractive index of the light passage portion and the plurality of unit patterns is in a range of 1.30 to 1.80.

20. The lighting device of claim 1, wherein an inclination angle of the inclined plane is greater than 23.6° and less than about 56.3°.

* * * * *